United States Patent
Zhang et al.

(10) Patent No.: US 10,162,132 B2
(45) Date of Patent: Dec. 25, 2018

(54) PULL PART AND OPTICAL MODULE

(71) Applicant: FUJITSU COMPONENT LIMITED, Tokyo (JP)

(72) Inventors: Hongfei Zhang, Tokyo (JP); Shinichiro Akieda, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/915,493

(22) Filed: Mar. 8, 2018

(65) Prior Publication Data
US 2018/0284363 A1    Oct. 4, 2018

(30) Foreign Application Priority Data
Mar. 30, 2017   (JP) .................................. 2017-066561

(51) Int. Cl.
*G02B 6/38*  (2006.01)
*G02B 6/42*  (2006.01)

(52) U.S. Cl.
CPC ......... *G02B 6/3893* (2013.01); *G02B 6/3838* (2013.01); *G02B 6/4236* (2013.01); *G02B 6/4281* (2013.01)

(58) Field of Classification Search
CPC ... G02B 6/3893; G02B 6/4261; G02B 6/4284
See application file for complete search history.

(56) References Cited

U.S. PATENT DOCUMENTS

| | | | |
|---|---|---|---|
| 9,071,003 B2 | 6/2015 | Lindkamp | |
| 9,130,308 B2 | 9/2015 | Wang et al. | |
| 9,182,558 B2 | 11/2015 | You et al. | |
| 9,250,402 B2* | 2/2016 | Ishii | G02B 6/4261 |
| 9,423,575 B2* | 8/2016 | Yang | G02B 6/4261 |
| 9,690,059 B2* | 6/2017 | Akieda | G02B 6/4245 |
| 10,079,452 B1* | 9/2018 | Zhang | H01R 13/6335 |
| 2012/0148198 A1* | 6/2012 | Togami | G02B 6/4246 |
| | | | 385/76 |
| 2014/0126957 A1* | 5/2014 | Shi | G02B 6/4246 |
| | | | 403/322.1 |

(Continued)

FOREIGN PATENT DOCUMENTS

| | | |
|---|---|---|
| JP | 2014-500602 | 1/2014 |
| JP | 2014-109776 | 6/2014 |

(Continued)

*Primary Examiner* — Daniel Petkovsek
(74) *Attorney, Agent, or Firm* — IPUSA, PLLC

(57) ABSTRACT

A pull part for coupling to a connector includes a latch configured to be coupled to a housing of the connector and a tab configured to be coupled to the latch, wherein the latch has two support parts, a beam, and connecting portions, the beam connecting the two support parts, the connecting portions being situated between the support parts and the beam, and the two support parts configured to be attached to the housing, wherein the tab includes a body and a handle, the body having connection grooves formed at one side thereof and having the handle at an opposite side thereof, and wherein the connecting portions situated between the support parts and the beam are inserted into the connection grooves so as to couple the latch and the tab to each other.

5 Claims, 18 Drawing Sheets

(56) References Cited

U.S. PATENT DOCUMENTS

| | | | |
|---|---|---|---|
| 2015/0241646 A1* | 8/2015 | Wang | G02B 6/423 |
| | | | 385/92 |
| 2015/0309269 A1 | 10/2015 | Daikuhara et al. | |
| 2016/0266340 A1* | 9/2016 | Zhang | G02B 6/32 |
| 2017/0090128 A1 | 3/2017 | Mori et al. | |
| 2017/0219781 A1* | 8/2017 | Wang | G02B 6/3893 |
| 2017/0343740 A1* | 11/2017 | Nguyen | G02B 6/3817 |

FOREIGN PATENT DOCUMENTS

| | | |
|---|---|---|
| JP | 2014-529164 | 10/2014 |
| JP | 2015-011173 | 1/2015 |
| JP | 2015-023143 | 2/2015 |
| WO | 2015/190211 | 12/2015 |

\* cited by examiner

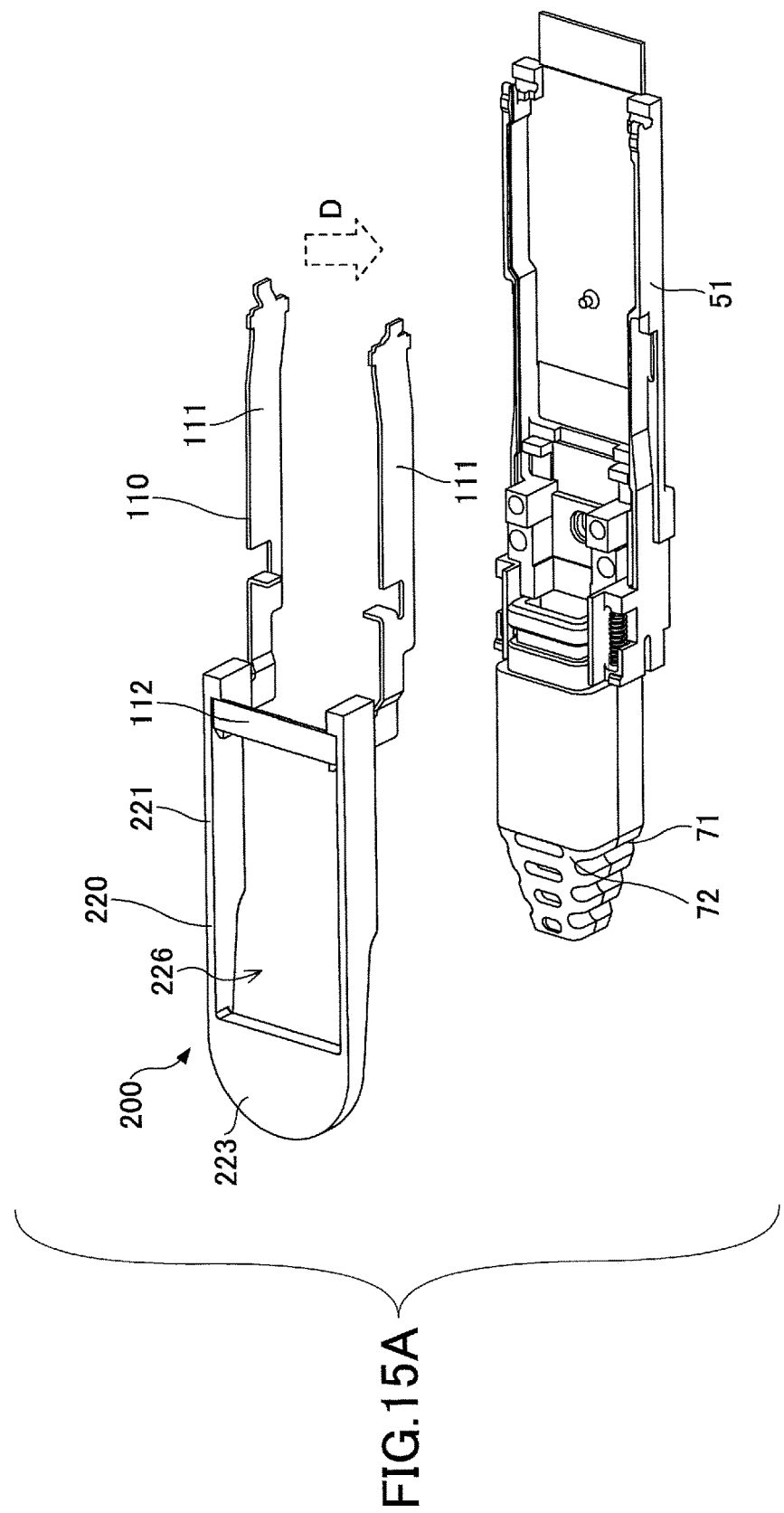

PULL PART AND OPTICAL MODULE

BACKGROUND OF THE INVENTION

1. Field of the Invention

The disclosures herein relate to a pull part and an optical module.

2. Description of the Related Art

Optical communications have been increasingly used for the high-speed interface of, supercomputers and high-end servers. Optical communications employ optical modules for conversion between electrical signals and optical signals.

An optical module includes light emitting devices, light receiving devices, a driver circuit for driving light emitting devices, and the like. The light emitting devices, the light receiving devices, and the driver circuit are mounted on a printed board, with optical waveguides providing connections between a lens ferrule and the light emitting and light receiving devices.

The optical module is connected to optical fibers and to a connector disposed on a back panel or the like of a communication apparatus. Optical modules are required to be connected at high density to a connector. Because of this, a pull part such as a pull tab is provided for the purpose of allowing easy removal of each connected optical module. The pull part, which is attached to the exterior of the housing, is configured to allow the optical module to be easily pulled off.

A pull tab includes a latch made of metal or the like for connection to the housing and a tab made of resin or the like for pulling with a finger. The latch and the tab are integrally formed as a unitary piece. When a pull part having an integrally formed latch and tab is to be attached to the housing of an optical module, the tab interferes with, and makes it difficult to perform, the work of attaching the pull part to the housing. A configuration that allows easy attachment to the housing is thus desired.

Further, some users may desire to replace tabs. However, the structure in which a latch and a tab are integrally formed as a unitary piece makes it impossible to replace only the tabs.

[Patent Document 1] Japanese Patent Application Publication No. 2015-23143
[Patent Document 2] Japanese Patent Application Publication No. 2014-109776
[Patent Document 3] Japanese National Publication of International Patent Application No. 2014-529164
[Patent Document 4] Japanese National Publication of International Patent Application No. 2014-500602
[Patent Document 5] International Publication Pamphlet No. WO 2015/190211
[Patent Document 6] Japanese Patent Application Publication No. 2015-11173

SUMMARY OF THE INVENTION

It is a general object of the present invention to provide a pull part and an optical module that substantially obviate one or more problems caused by the limitations and disadvantages of the related art.

According to one embodiment, a pull part for coupling to a connector includes a latch configured to be coupled to a housing of the connector and a tab configured to be coupled to the latch, wherein the latch has two support parts, a beam, and connecting portions, the beam connecting the two support parts, the connecting portions being situated between the support parts and the beam, and the two support parts configured to be attached to the housing, wherein the tab includes a body and a handle, the body having connection grooves formed at one side thereof and having the handle at an opposite side thereof, and wherein the connecting portions situated between the support parts and the beam are inserted into the connection grooves so as to couple the latch and the tab to each other.

At least one embodiment enables easy attachment of a pull part to a connector such as an optical module.

BRIEF DESCRIPTION OF THE DRAWINGS

Other objects and further features of the present invention will be apparent from the following detailed description when read in conjunction with the accompanying drawings, in which:

FIGS. 15A and 15B are drawings illustrating mounting of the pull part to the optical module according to the second embodiment.

DESCRIPTION OF THE PREFERRED EMBODIMENTS

In the following, embodiments for implementing the invention will be described. The same members or the like are referred to by the same numerals, and a description thereof will be omitted.

First Embodiment

An optical module to which a pull part having an integrally formed latch and tab is attached will be described with reference to FIG. 1.

Figure 1:
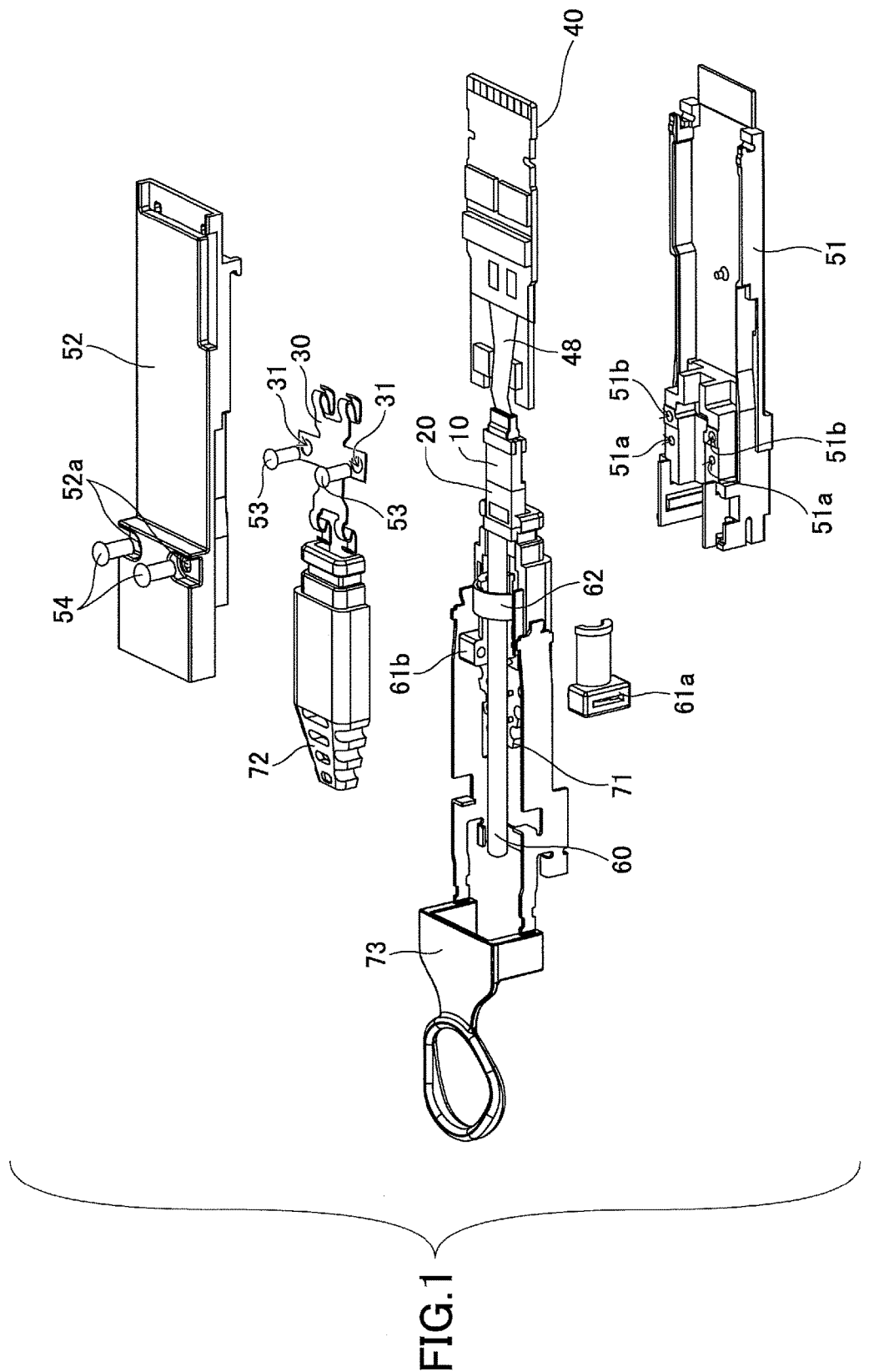
FIG. 1 is an exploded axonometric view of an optical module.

An optical module (which may sometimes be referred to as a connector) illustrated in FIG. 1 is configured such that a lens ferrule 10 and an MT ferrule 20 fastened to each other with a clip 30, a printed board 40, and an optical waveguide 48 are installed in the housing having a lower housing 51 and an upper housing 52, with an optical cable 60 attached thereto. The lens ferrule 10 and the MT ferrule 20, which are fastened to each other with the clip 30, are aligned with each other by use of guide pins (not shown).

The printed board 40 has a connector disposed thereon for connection to an FPC (flexible printed circuit). The FPC has light emitting devices such as VCSELs (vertical cavity surface emitting lasers) for converting electrical signals into optical signals and light receiving devices such as photo diodes for converting optical signals into electrical signals. The printed board 40 has a driver IC for driving light emitting devices, a TIA for converting currents from light receiving devices into voltages, and connection terminals for connection with an external device. The printed board 40 is disposed on the lower housing 51.

The optical waveguide 48 is a flexible sheet, one end of which is coupled to the FPC The lens ferrule 10 and the MT ferrule 20 are clamped with the clip 30 inside the optical module.

The other end of the optical waveguide 48 is coupled to the lens ferrule 10. The lens ferrule 10 and the MT ferrule 20 are disposed on the lower housing 51. The clip 30 has two screw holes 31, into which screws 53 are inserted and mounted to screw holes 51a of the lower housing 51. The lens ferrule and the MT ferrule 20 are thus fastened to the lower housing 51 via the clip 30.

Sleeves 61a and 61b are fastened to the optical cable 60 with a swage ring 62. Cable boots 71 and 72 covers the optical cable 60 and the sleeves 61a and 62b fastened thereto from above and below, respectively. A pull part 73 is then attached.

The upper housing 52 is placed on the lower housing 51 to cover the lens ferrule 10 and the MT ferrule 20 fastened with the clip 30 and the printed board 40 disposed on the lower housing 51. The upper housing 52 and the lower housing 51 are threadably fastened to each other with screws 54 while screw holes 52a of the upper housing 52 and screw holes 51b of the lower housing 51 are aligned with each other.

Figure 2:
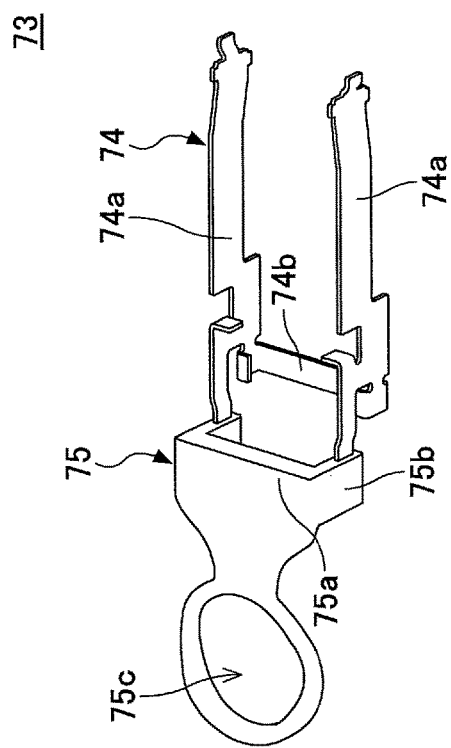
FIG. 2 is an axonometric view of a pull part.
Figure 3:
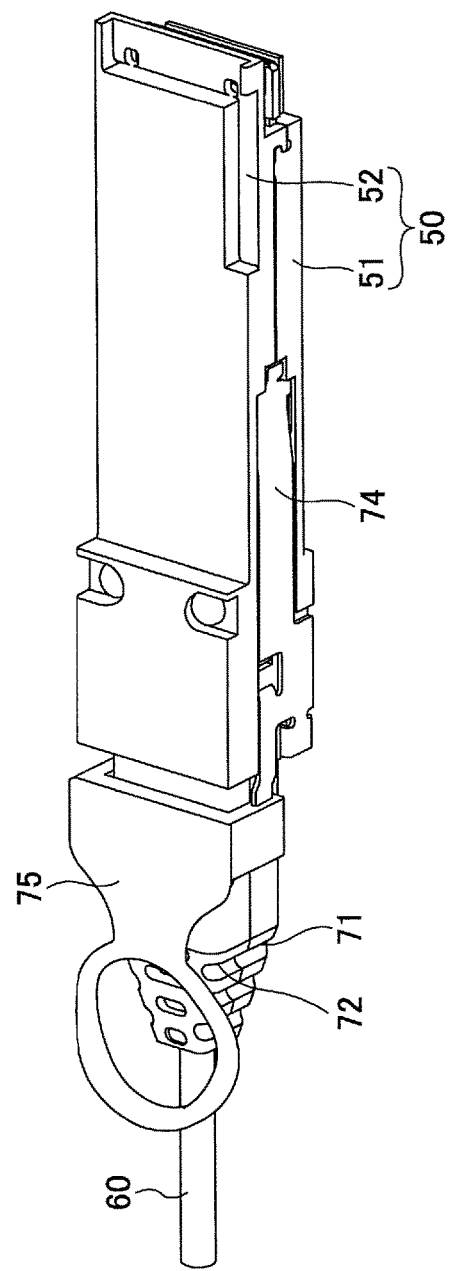
FIG. 3 is an axonometric view of the optical module with the pull part attached thereto.

As illustrated in FIG. 2, the pull part 73 has a latch 74 made of a metal material and a tab 75 made of a resin material. FIG. 2 is an axonometric view of the pull part 73. FIG. 3 is an axonometric view of the optical module with the pull part 73 attached to a housing 50.

The latch 74 has two support parts 74a for engagement with the two side faces of the housing 50, respectively, and also has a beam 74b connecting the support parts 74a. Each of the support parts 74a has a bar shape longitudinally extending in the direction in which the pull part 73 is pulled. The support parts 74a have connection portions near one end thereof that are engaged with the housing 50.

The tab 75 has a body 75a, connection parts 75b situated on two sides of the body 75a, respectively, and a hole 75c into which a finger is inserted when pulling off the optical module. The connection parts 75b of the tab 75 are connected to the latch 74. The pull part 73 is configured such that the latch 74 and the tab 75 are integrally formed as a unitary piece by insert molding or the like. One end of each of the support parts 74a is fixedly connected to a corresponding one of the connection parts 75b of the tab 75.

The beam 74b extends perpendicularly to the direction in which the support parts 74a extend, i.e., the direction in which the pull part 73 is pulled. The beam 74b is situated under the housing 50 when the pull part 73 is attached to the housing 50. The tab 75 is situated over the cable boots 71 and 72, which are coupled to the housing 50.

Figure 4A:
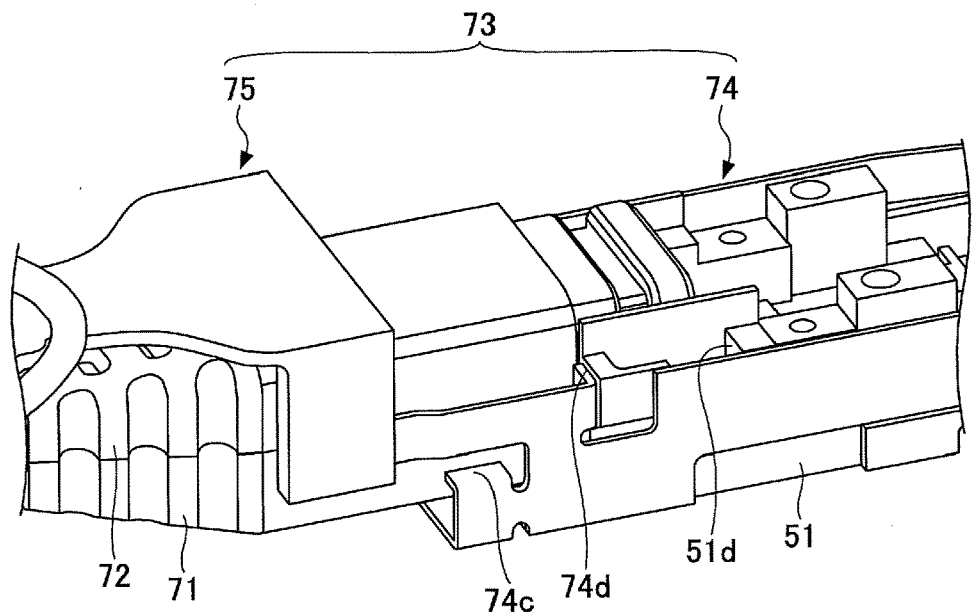
FIGS. 4A and 4B are drawings illustrating mounting of the pull part to the optical module.
Figure 4B:
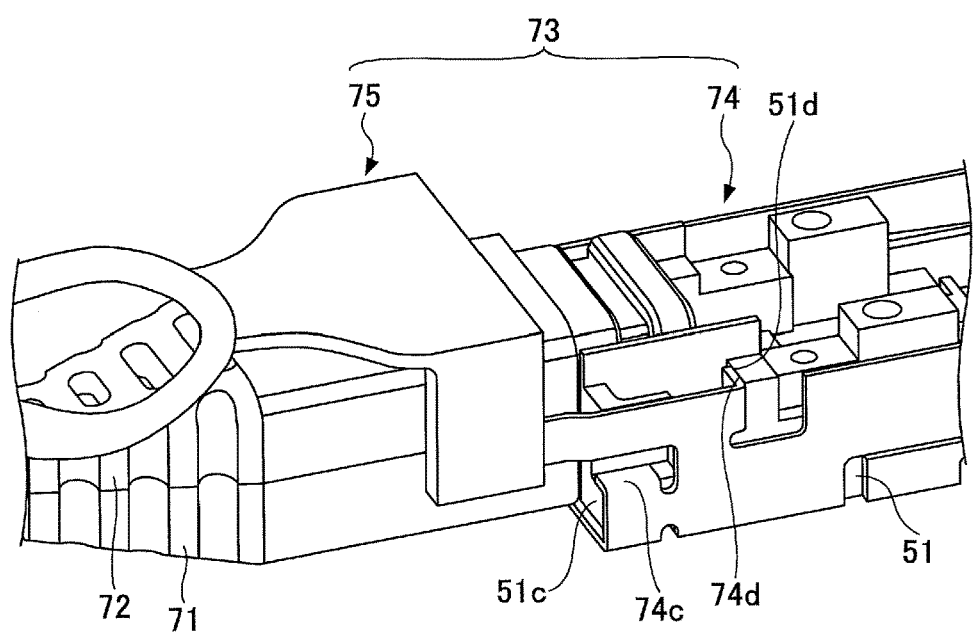

In order to attach the pull part 73 to the housing 50, the housing 50 with the optical cable 60 attached thereto is inserted into a space enclosed by the support parts 74a and beam 74b of the latch 74 and the body 75a and connection parts 75b of the tab 75. Because of this, the assembly work is cumbersome and difficult to perform. As illustrated in FIG. 4A, the cable boots 71 and 72 as well as the lower housing 51 are inserted into the space between the latch 74 and the tab 75 when attaching the pull part 73 as illustrated in FIG. 4B. In so doing, ledges 51c of the lower housing 51 need to enter the space inside hooks 74c, and contact faces 74d of the latch 74 need to come in contact with contact faces 51d of the lower housing 51.

<Pull Part and Optical Module>

Figure 5A:
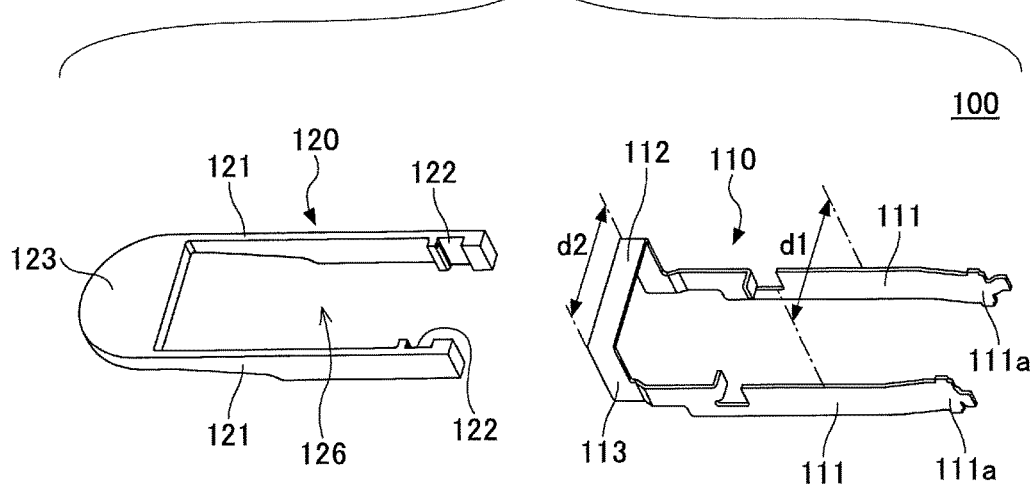
FIGS. 5A and 5B are axonometric views of a pull part according to a first embodiment.
Figure 5B:
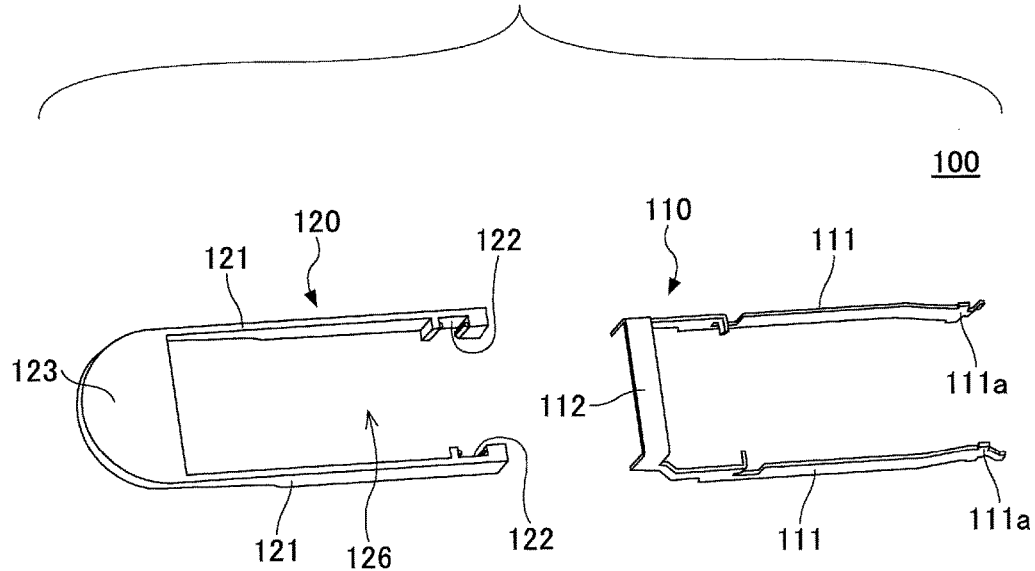
Figure 6A:
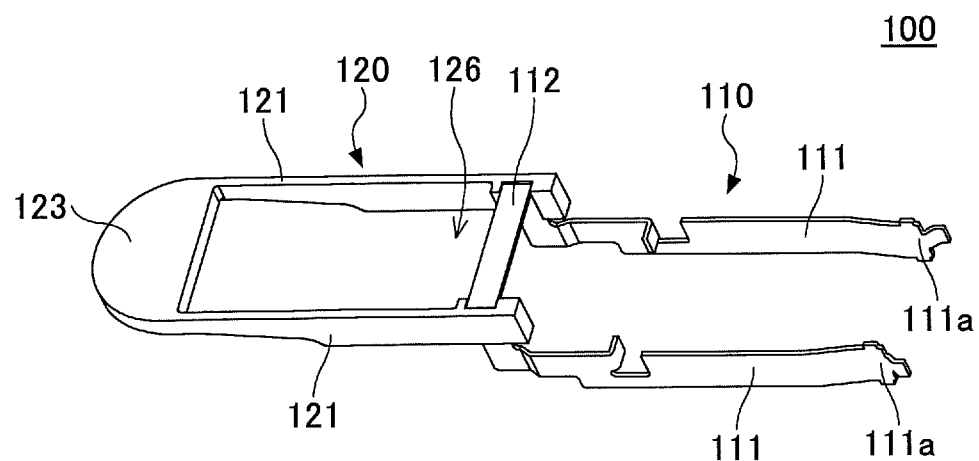
FIGS. 6A and 6B are axonometric views of the pull part according to the first embodiment.
Figure 6B:
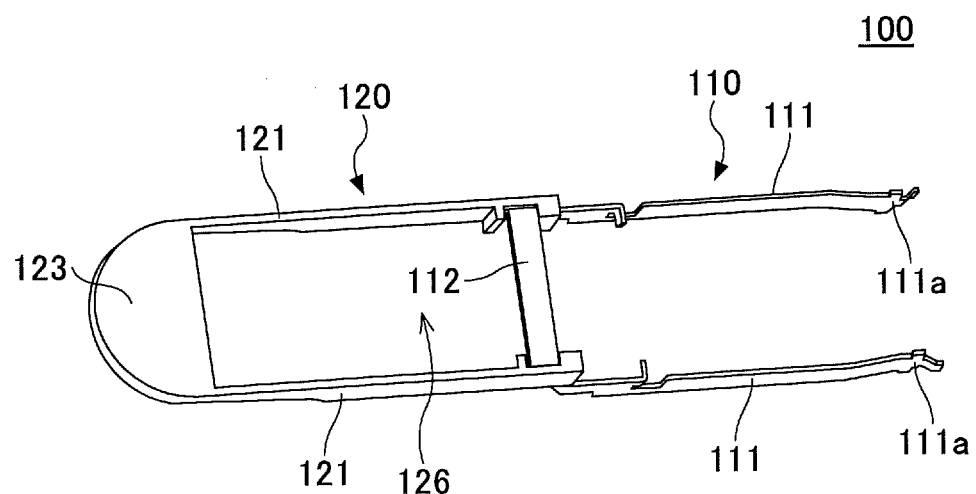

In the following, a pull part and an optical module of a first embodiment will be described with reference to FIGS. 5A and 5B as well as FIGS. 6A and 6B. FIGS. 5A and 6B are axonometric views of a latch 110 and a tab 120 separated from each other, showing views taken from different angles. FIGS. 6A and 6B are axonometric views of the latch 110 and the tab 120 coupled to each other, showing views taken from different angles.

A pull part 100 of the present embodiment includes the latch 110 and the tab 120 that are separable from each other. The latch 110 and the tab 120 may be made of the same material, but may preferably made of different materials taking into account the respective functions.

The pull part 100 is formed by coupling the latch 110 to the tab 120. The latch 110, which is a generally letter-U shape made of metal or the like, has two support parts ill extending in the direction of pulling (i.e., the direction in which the pull part 100 is pulled) and a beam 112 connecting the support parts 111. The support parts 111 have connection portions 111a formed at first ends thereof for coupling to the housing 50, and have second ends thereof connected to each other via the beam 112. In the present embodiment, a length d2 of the beam 112 is shorter than a distance d1 between the two support parts 111. This arrangement serves to prevent the pull part from having a wider width.

The tab 120 is made of a resin material or the like. A body 121 has connection grooves 122 on a first side thereof for coupling to the latch 110. Connecting portions 113 situated between the support parts 111 and beam 112 of the latch 110 are inserted into, and engaged with, the connection grooves 122, thereby enabling coupling between the latch 110 and the tab 120. The body 121 has a handle 123 formed on a second side thereof suitable for being pulled by a finger.

Figure 7A:
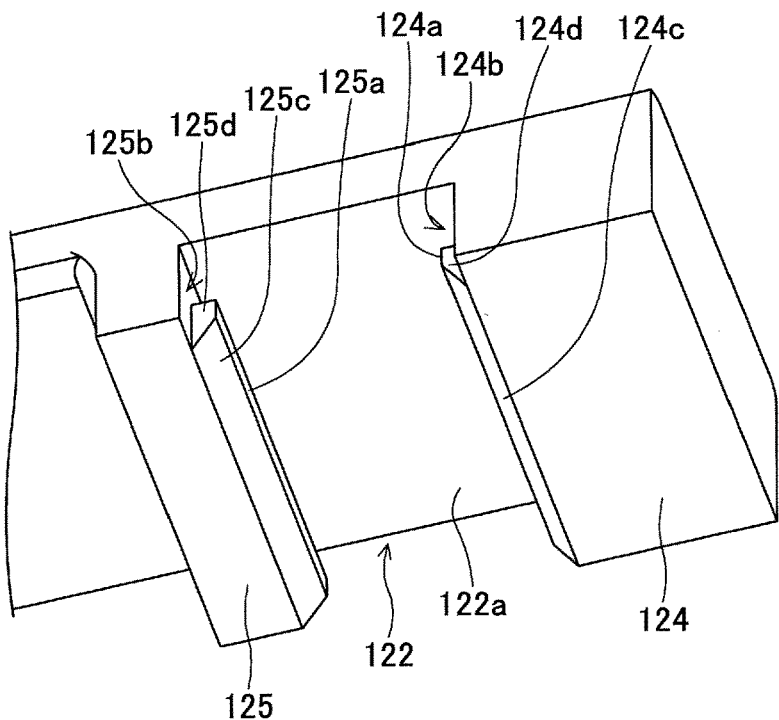
FIGS. 7A and 7B are enlarged views of part of a tab according to the first embodiment.
Figure 7B:
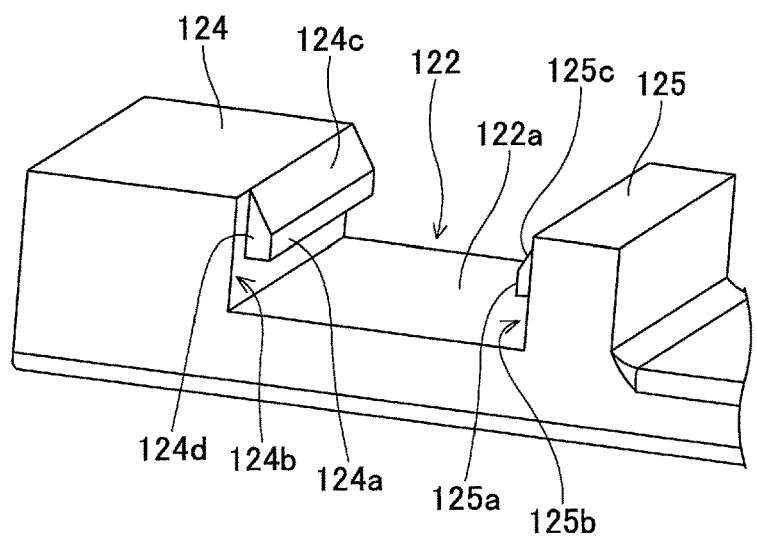

As illustrated in FIGS. 7A and 7B, the body 121 has a first projection 124 and a second projection 125 formed on the first side thereof and bulging in a direction perpendicular to the direction of pulling. The gap between the first projection 124 and the second projection 125 serves as the connection groove 122. FIGS. 7A and 7B are axonometric, enlarged view of the connection groove 122, and show views taken from different angles.

The connection groove 122 is defined by the first projection 124 and the second projection 125 facing each other. The first projection 124 has a first ledge 124a formed thereon bulging into the connection groove 122 to form a first hook, such that a gap 124b is formed between a bottom face 122a of the connection groove 122 and the first ledge 124a. The second projection 125 has a second ledge 125a formed thereon bulging into the connection groove 122 to form a second hook, such that a gap 125b is formed between the bottom face 122a and the second ledge 125a.

The latch 110 and the tab 120 are coupled to each other by inserting the connecting portions 113 into the connection grooves 122, respectively. More specifically, each connecting portion 113 is inserted into, and engaged with, the gap 124b of the first hook formed by the first ledge 124a and the gap 125b of the second hook formed by the second ledge 125a, thereby enabling coupling between the latch 110 and the tab 120. With each connecting portion 113 being fit in the gaps 124b and 125b, each connecting portion 113 is securely held by the first hook formed by the first ledge 124a and the second hook formed by the second ledge 125a, thereby being prevented from readily disengaging from the connection groove 122.

The first ledge 124a has a sloped face 124c on the entrance side of the connection groove 122 in order to allow the connecting portion 113 to be readily inserted. The second ledge 125a also has a sloped face 125c on the entrance side of the connection groove 122. Further, for the purpose of preventing the latch 110 from protruding outwardly upon inserting the connecting portions 113 into the connection grooves 122, the first ledge 124a and the second ledge 125a are shorter than the entire length of the connection groove 122 such as to provide a setback 124d and a setback 125d, respectively, which have a size corresponding to the thickness of the beam 112.

Figure 8A:
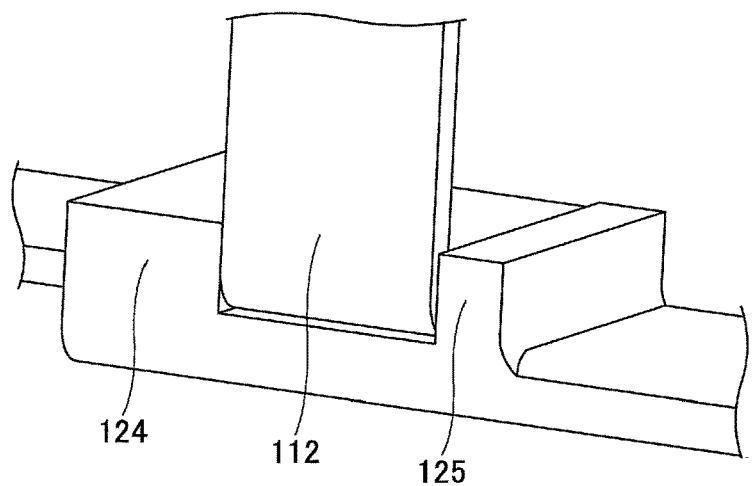
FIGS. 8A and 8B are enlarged views of a connecting part at which the tab is coupled to a latch according to the first embodiment.
Figure 8B:
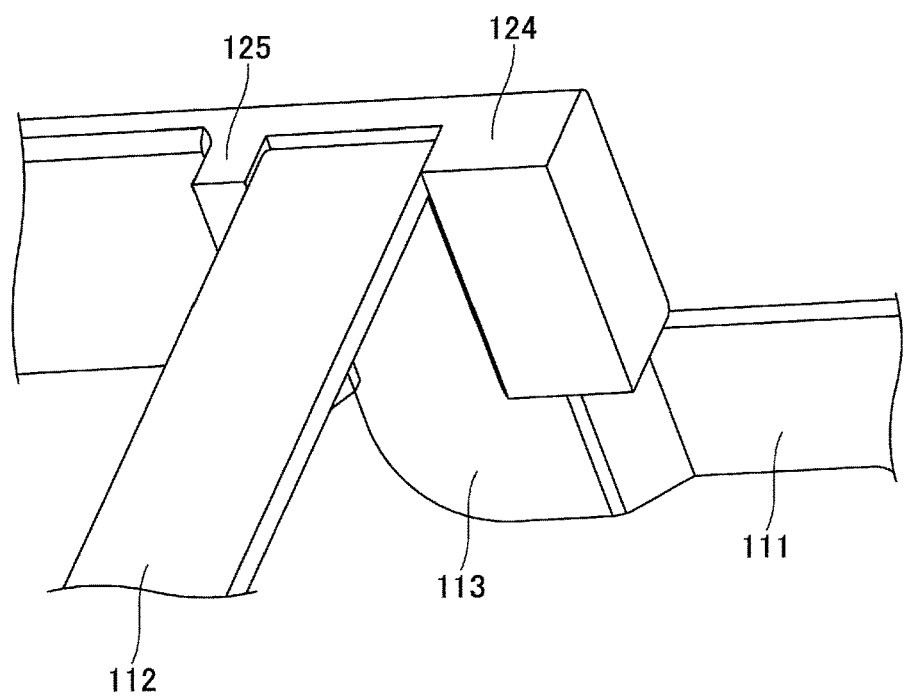

FIGS. 8A and 83 are axonometric, enlarged views of the latch 110 and the tab 120 coupled to each other, showing views taken from different angles. In the present embodiment, the latch 110 and the tab 120 coupled to each other provide a framed opening 126 enclosed by the handle 123 and body 121 of the tab 120 and the beam 112 of the latch 110.

Figure 9A:
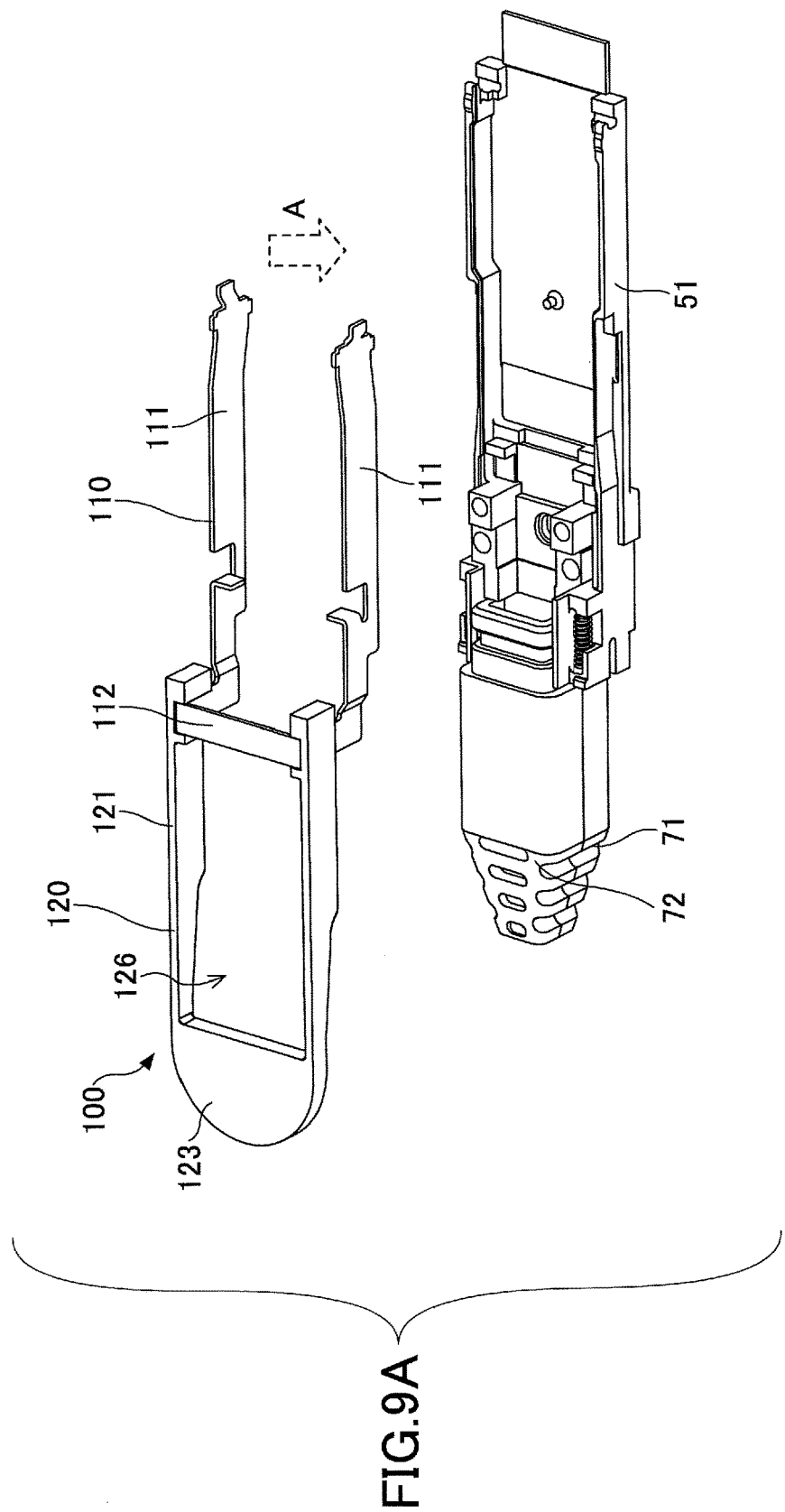
FIGS. 9A and 9B are drawings illustrating mounting of the pull part to the optical module according to the first embodiment.
Figure 9B:
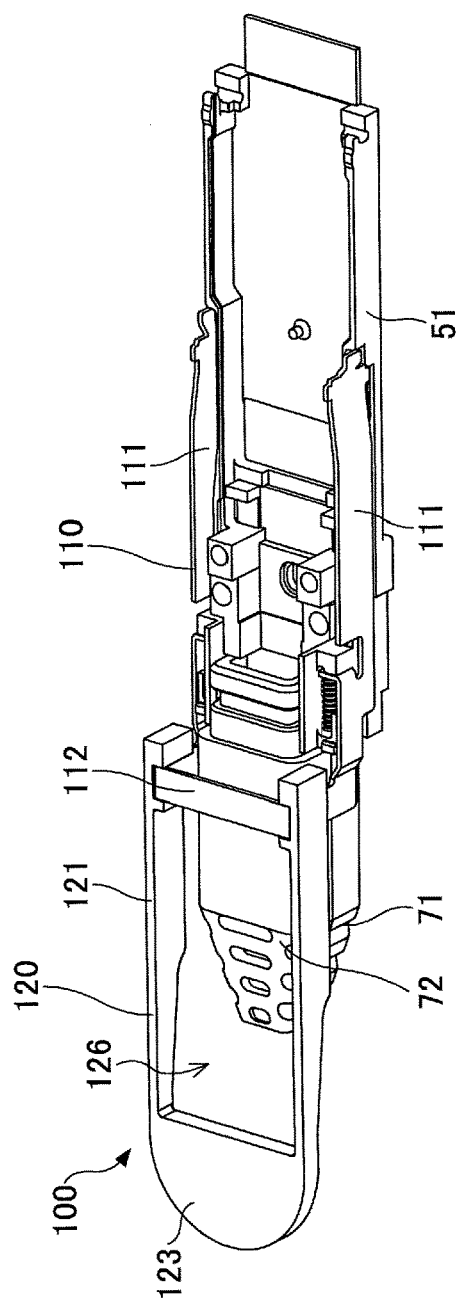

In the following, mounting of the pull part 100 to the housing 50 will be described with reference to FIGS. 9A and 9B. As illustrated in FIG. 9A, the pull part 100 is horizontally aligned with the lower housing 51 over the cable boots 71 and 72 and the lower housing 51. The pull part 100 is then moved in the direction indicated by a dotted-line arrow A to be attached to the lower housing 51 at a desired position as illustrated in FIG. 9B. With this arrangement, mounting of the pull part is readily performed, compared to the configuration explained with reference to FIG. 4. This is because the pull part 100 has no obstructing parts on the lower side thereof when the housing 50 is inserted thereinto.

Figure 10:
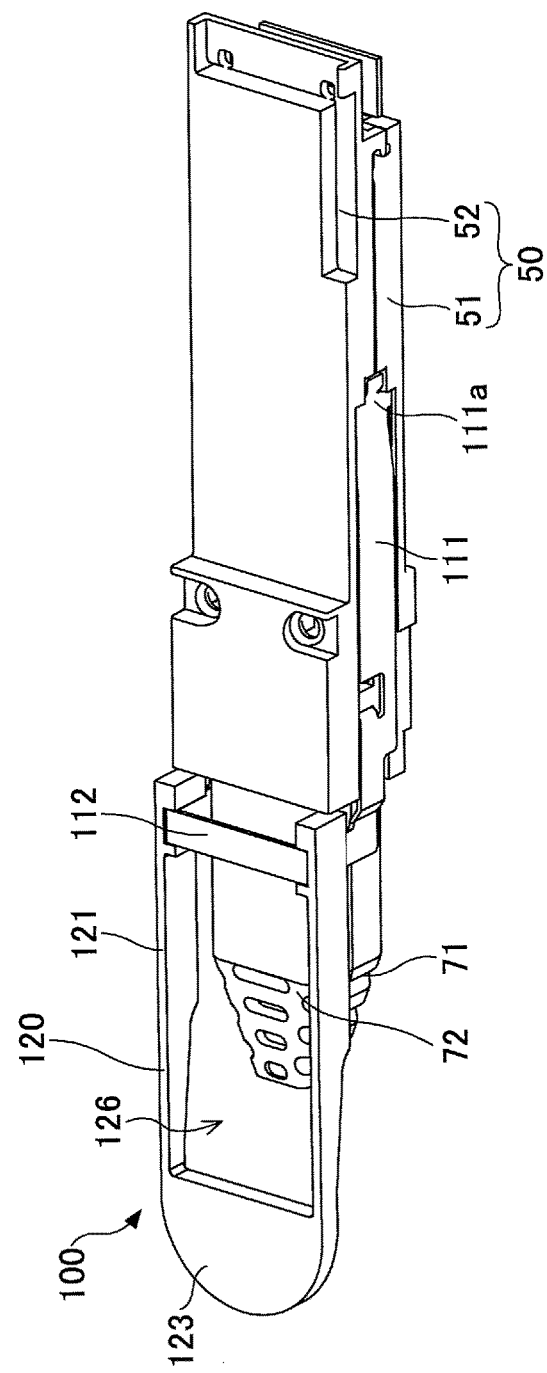
FIG. 10 is an axonometric view of the optical module according to the first embodiment.

FIG. 10 is an axonometric view of the optical module with the pull part 100 attached thereto. In the present embodiment, the tab 120 can be detached from the latch 110 while the latch 110 is attached to the housing 50, which allows only the tab 120 to be readily replaced.

Second Embodiment

Figure 11A:
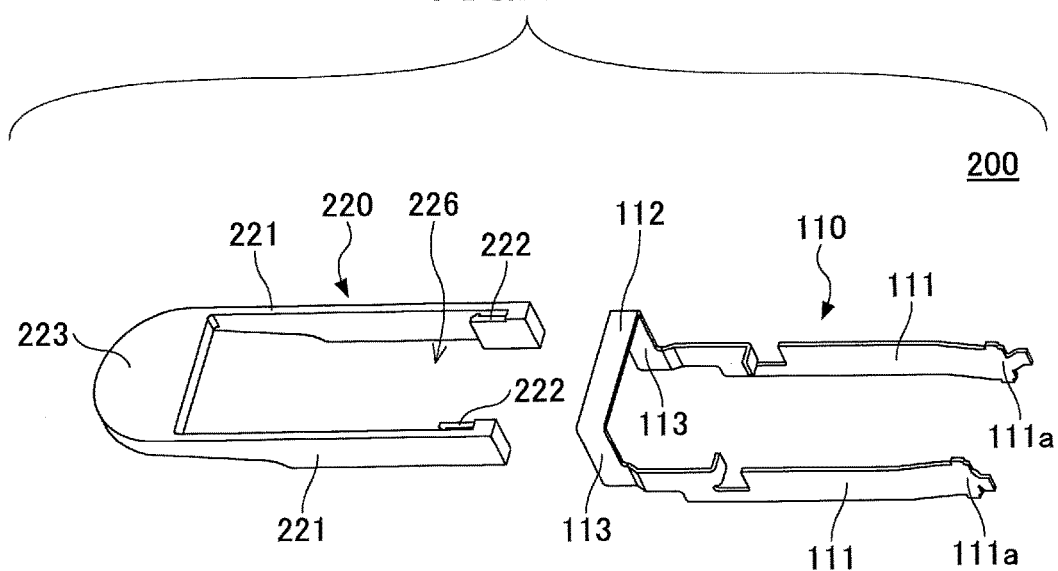
FIGS. 11A and 11B are axonometric views of a pull part according to a second embodiment.
Figure 11B:
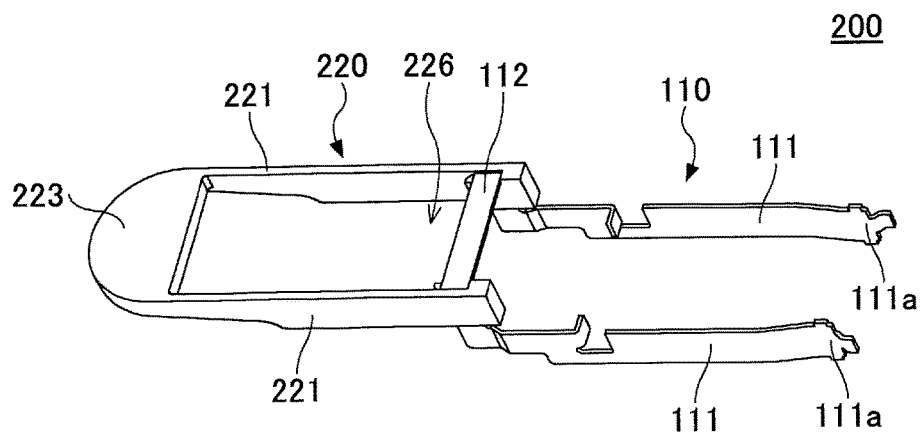
Figure 12:
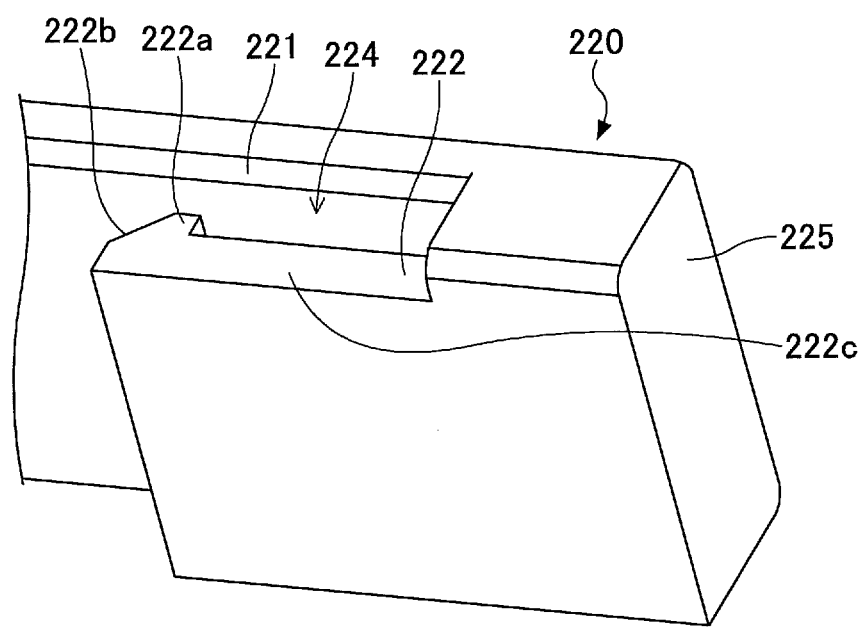
FIG. 12 is an enlarged view of part of a tab according to the second embodiment.

In the following, a pull part and an optical module of a second embodiment will be described with reference to FIGS. 11A and 12B and FIG. 12. A pull part 200 of the present embodiment includes the latch 110 and the tab 220 that are separable from each other. FIG. 11A is an axonometric view of the latch 110 and the tab 220 separated from each other. FIG. 11B is an axonometric view of the latch 110 and the tab 220 coupled to each other. FIG. 12 is an axonometric, enlarged view of a relevant part of the tab 220.

The pull part 200 is formed by coupling the latch 110 to the tab 220.

The tab 220 is made of a resin material or the like. A body 221 of the tab 220 has hold parts 222 on a first side thereof for coupling to the latch 110. The connecting portions 113 situated between the support parts 111 and beam 112 of the latch 110 are inserted into, and engaged with, the hold parts 222, thereby enabling coupling between the latch 110 and the tab 220. The body 221 has a handle 223 formed on a second side thereof suitable for being pulled by a finger As illustrated in FIG. 12, the hold part 222 is situated inside the tab 220 such as to extend substantially in parallel to the direction of pulling. A connection groove 224 for receiving the connecting portion 113 is formed between the body 221 and the hold part 222. The hold part 222 is connected to the body 221 such that the connection groove 224 is closed on the side toward an end 225 and open on the opposite side. The connecting portion 113 is inserted from the open side into the connection groove 224.

The hold parts 222 of the tab 220 are formed such as to face each other. A ledge 222a bulging into the connection groove 224 is formed on the hold part 222 at the entrance of the connection groove 224, thereby forming a hook. Inserting the connecting portion 113 into the connection groove 224 deeper than the ledge 222a enables secure coupling between the tab 220 and the latch 110, preventing disengagement of the tab 220.

Figure 13A:
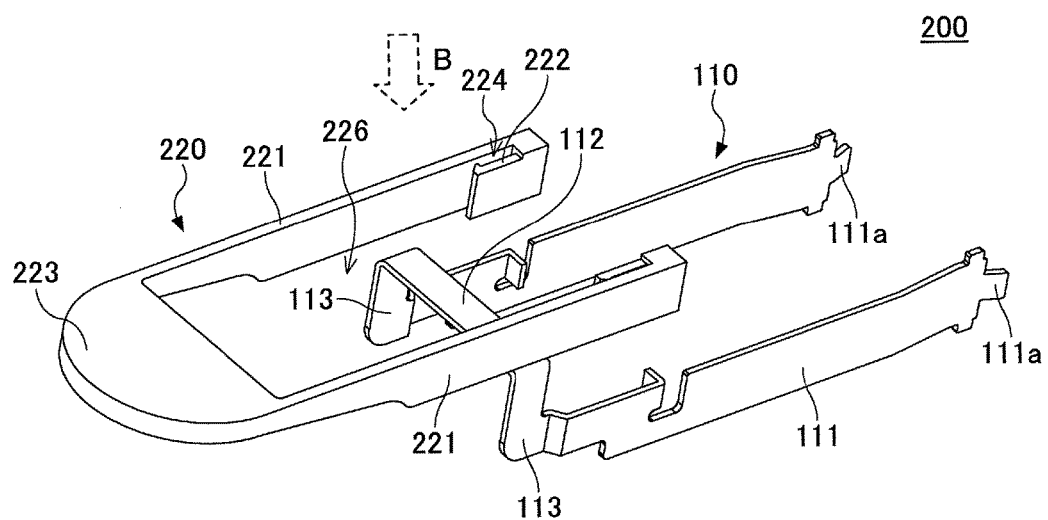
FIGS. 13A through 13C are drawings illustrating mounting of the tab to the latch according to the second embodiment.
Figure 13B:
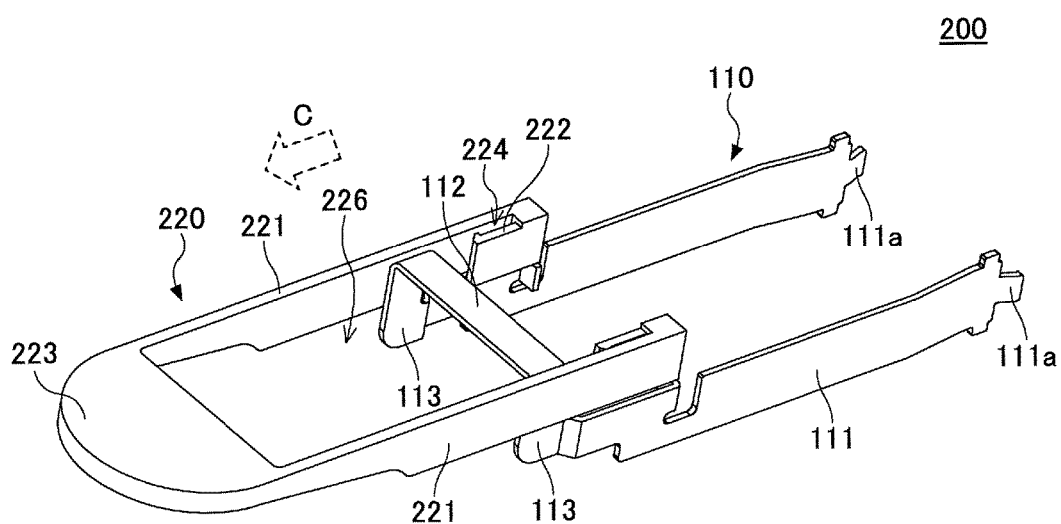
Figure 13C:
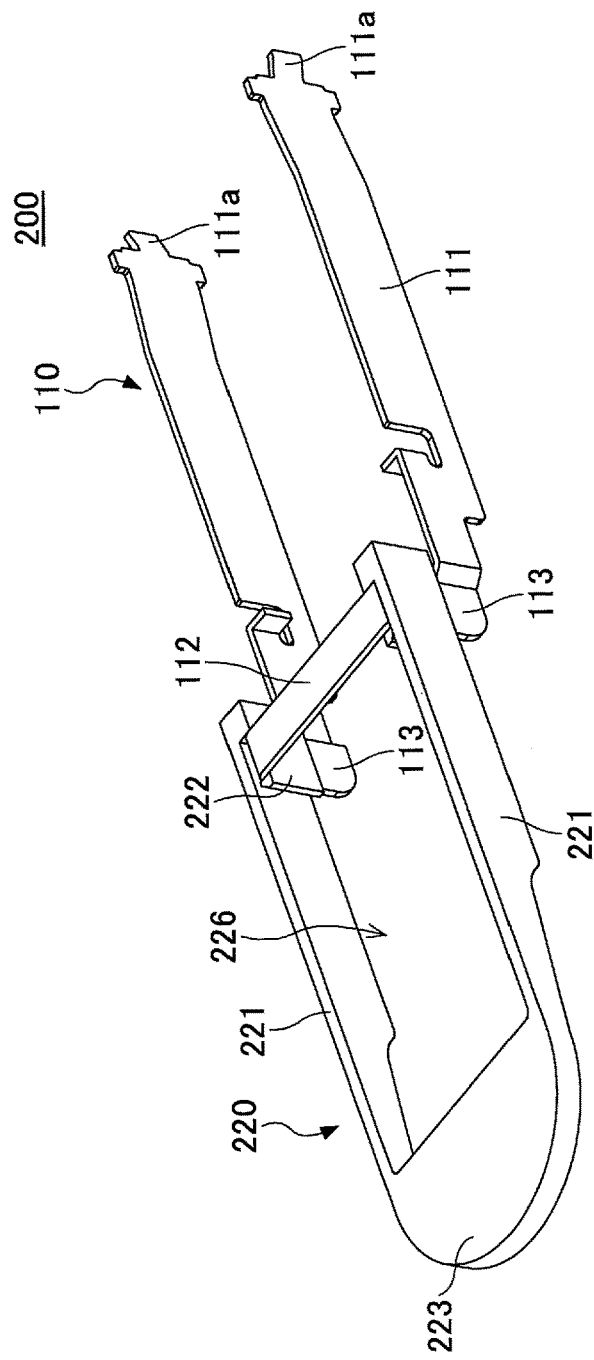

In the following, coupling of the tab 220 to the latch 110 will be described with reference FIGS. 13A through 13C. When coupling the tab 220 to the latch 110, the latch 110 and the tab 220 are horizontally aligned with each other such that the beam 112 is situated inside the body 221 as illustrated in FIG. 13A. The tab 220 is then moved as indicated by a dotted-line arrow B, followed by moving the tab 220 to the left as indicated by a dotted-line arrow C as illustrated in FIG. 13B. As a result, the connecting portions 113 are inserted into the connection grooves 224 as illustrated in FIG. 13C, which enables coupling between the latch 110 and the tab 220. The connecting portions 113 are securely held by the hooks formed by the ledges 222a of the hold parts 222, so that the connecting portions 113 do not loosely disengage from the connection groove 224.

Figure 14A:
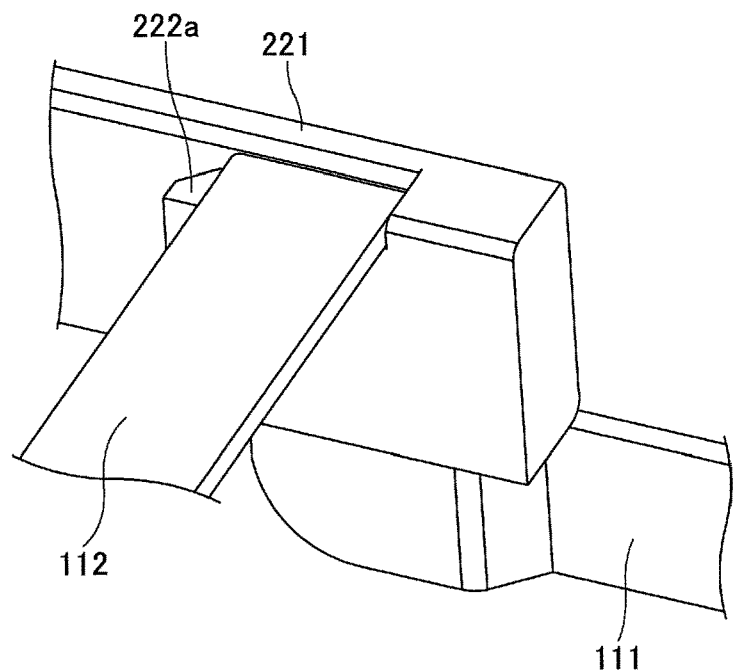
FIGS. 14A and 14B are enlarged views of a connecting part at which the tab is coupled to the latch according to the second embodiment.
Figure 14B:
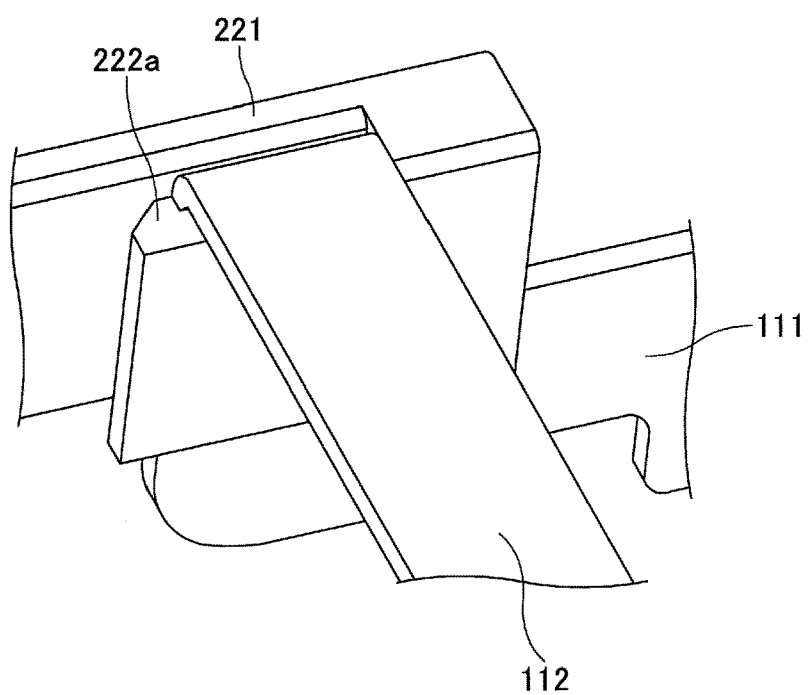

The ledge 222a has a sloped face 222b on the entrance side of the connection groove 224 as illustrated in FIG. 12 in order to allow the connecting portion 113 to be readily inserted into the connection groove 224. Further, for the purpose of preventing the latch 110 from protruding outwardly upon inserting the connecting portions 113 into the connection grooves 224, part of the hold part 222 and the ledge 222a are shorter than the entire length of the connection groove 224 such as to provide a setback 222c having a size corresponding to the thickness of the beam 112. FIGS. 14A and 14B are axonometric, enlarged views of the latch 110 and the tab 220 coupled to each other, showing views taken from different angles.

In the present embodiment, the latch 110 and the tab 220 coupled to each other provide a framed opening 226 enclosed by the handle 223 and body 221 of the tab 220 and the beam 112 of the latch 110.

Figure 15B:
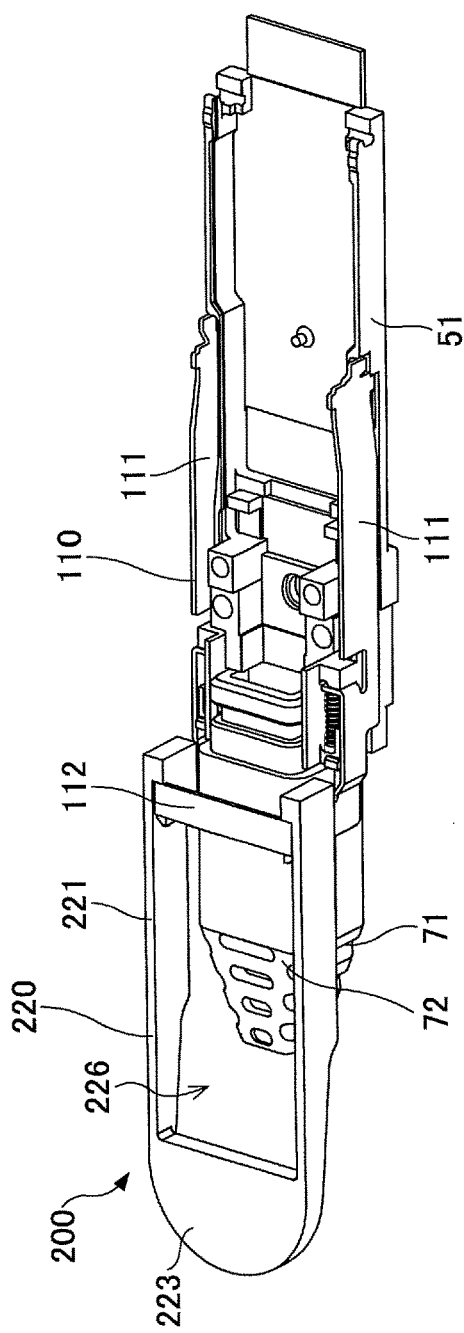

In the following, mounting of the pull part 200 to the housing 50 will be described with reference to FIGS. 15A and 15B. As illustrated in FIG. 15A, the pull part 200 and the lower housing 51 are horizontally aligned with each other. The pull part 200 is then moved in the direction indicated by a dotted-line arrow D to be mounted to the lower housing 51 as illustrated in FIG. 15B. The pull part 200 of the present embodiment has no obstructing parts on the lower side thereof from which the housing 50 is inserted as illustrated in FIG. 15A and the like. This arrangement allows easy insertion of the housing 50.

Figure 16:
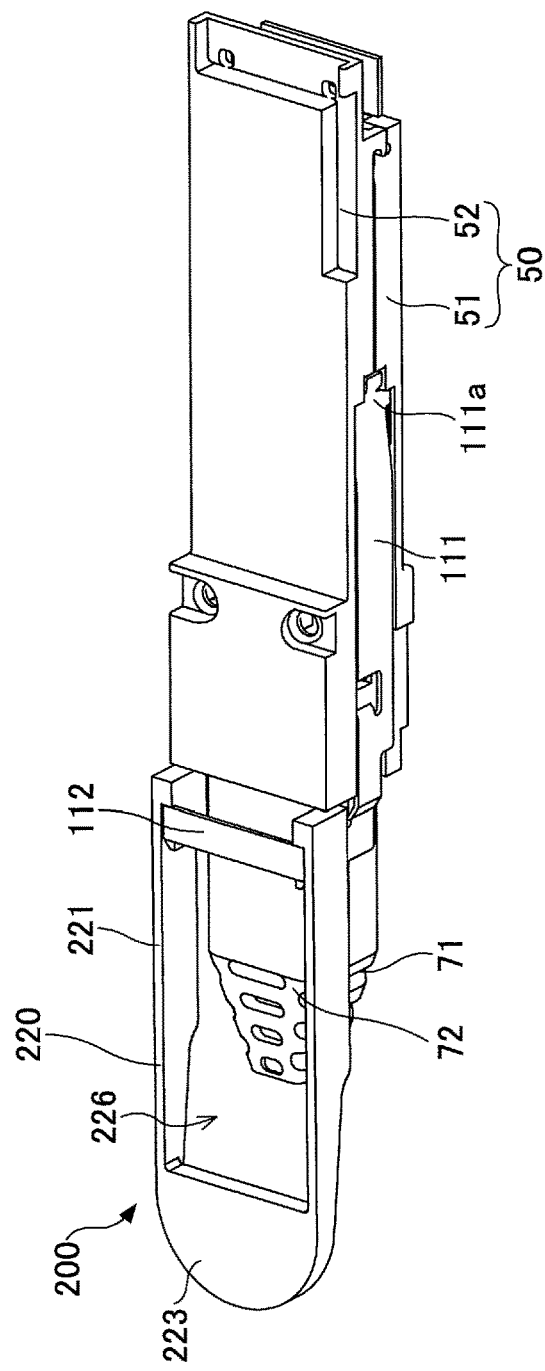
FIG. 16 is an axonometric view of the optical module according to the second embodiment.

FIG. 16 is an axonometric view of the optical module with the pull part 200 attached thereto. In the present embodiment, the tab 220 can be detached from the latch 110 while the latch 110 is attached to the housing 50, which allows only the tab 220 to be readily replaced.

Configurations other than those described above are the same as or similar to those of the first embodiment.

Further, although a description has been given with respect to one or more embodiments of the present invention, the contents of such a description do not limit the scope of the invention.

The present application is based on and claims the benefit of priority of Japanese priority application No. 2017-066561 filed on Mar. 30, 2017, with the Japanese Patent Office, the entire contents of which are hereby incorporated by reference.

What is claimed is:

1. A pull part for coupling to a connector, comprising:
   a latch configured to be coupled to a housing of the connector; and
   a tab configured to be coupled to the latch,
   wherein the latch has two support parts, a beam, and connecting portions, the beam connecting the two support parts, the connecting portions being situated between the support parts and the beam, and the two support parts configured to be attached to the housing,
   wherein the tab includes a body and a handle, the body having connection grooves formed at one side thereof and having the handle at an opposite side thereof, and
   wherein the connecting portions of the latch situated between the support parts and the beam are locked to the connection grooves of the tab so as to detachably couple the latch and the tab to each other.

2. The pull part as claimed in claim 1, wherein each of the connection grooves of the tab is situated between, and defined by, a first projection and a second projection bulging perpendicularly to a direction in which the pull part is pulled,
   wherein the first projection has a first hook, and the second projection has a second hook, and
   wherein the connecting portions of the latch are inserted into the connection grooves of the tab such that each of the connecting portions of the latch is placed in a gap between the first hook and a bottom face of a corresponding one of the connection grooves of the tab and in a gap between the second hook and the bottom face of the corresponding one of the connection grooves of the tab.

3. The pull part as claimed in claim 1, wherein the tab has hold parts formed on an inside thereof, and the body and the hold parts are connected to each other on a side opposite from a side toward which the pull part is pulled,
   wherein the connection grooves of the tab are defined as gaps between the body and the hold parts, and the hold parts have hooks projecting into the connection grooves of the tab, and
   wherein the connecting portions of the latch are inserted deeper into the connection grooves of the tab than ends of the hooks.

4. An optical module, comprising:
   the pull part of claim 1; and
   the connector to which the pull part is coupled,
   wherein the connector includes devices for conversion between optical signals and electrical signals.

5. A pull part for coupling to a connector, comprising:
   a latch configured to be coupled to a housing of the connector; and
   a tab configured to be coupled to the latch,
   wherein the latch has
   two support bars configured to be coupled to the housing of the connector and extending parallel to each other in a first direction which is parallel to a direction of pulling off the connector,
   two connecting bars, a first end of each of the connecting bars being connected to one end of the respective one of the support bars, the two connecting bars extending parallel to each other in a second direction perpendicular to the first direction, and
   a beam connecting second ends of the two connecting bars,
   wherein the tab has
   two main bars extending parallel to each other in the first direction, each of the two main bars having a connection groove formed in proximity of a first end thereof, and
   a handle connecting second ends of the two main bars, and
   wherein the connecting bars of the latch are inserted into, and engaged with, the connection grooves of the tab so as to couple the tab to the latch.

* * * * *